US011074328B2

United States Patent
Tong et al.

(10) Patent No.: US 11,074,328 B2
(45) Date of Patent: Jul. 27, 2021

(54) USER AUTHENTICATION USING PASSPHRASE EMOTIONAL TONE

(71) Applicant: International Business Machines Corporation, Armonk, NY (US)

(72) Inventors: Britney Tong, Austin, TX (US); Katherine Jane Lamendola, Austin, TX (US); David Jimenez, Austin, TX (US); Dinesh Chowdary Papineni, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 248 days.

(21) Appl. No.: 16/135,283

(22) Filed: Sep. 19, 2018

(65) Prior Publication Data

US 2020/0089854 A1    Mar. 19, 2020

(51) Int. Cl.
| | |
|---|---|
| *G06F 21/32* | (2013.01) |
| *G06F 21/60* | (2013.01) |
| *G10L 25/63* | (2013.01) |
| *G10L 17/24* | (2013.01) |

(52) U.S. Cl.
CPC ............ *G06F 21/32* (2013.01); *G06F 21/604* (2013.01); *G10L 17/24* (2013.01); *G10L 25/63* (2013.01)

(58) Field of Classification Search
CPC .. H01M 10/4257; H01M 2/0404; H01M 2/06; H01M 2220/30; H01M 2/1016; H01M 10/425

See application file for complete search history.

(56) References Cited

U.S. PATENT DOCUMENTS

| | | | |
|---|---|---|---|
| 8,812,319 B2 | 8/2014 | Skerpac | |
| 10,008,208 B2 * | 6/2018 | Aley-Raz | G10L 17/12 |
| 2009/0306981 A1 * | 12/2009 | Cromack | G06F 16/685 |
| | | | 704/235 |
| 2014/0282956 A1 * | 9/2014 | Kennedy | H04L 63/08 |
| | | | 726/7 |
| 2016/0372116 A1 | 12/2016 | Summerfield | |
| 2017/0140760 A1 | 5/2017 | Sachdev | |
| 2018/0060557 A1 | 3/2018 | Valenti | |
| 2018/0089407 A1 | 3/2018 | Watson | |
| 2019/0197224 A1 * | 6/2019 | Smits | G06F 21/32 |
| 2020/0089850 A1 * | 3/2020 | Wan | G06F 21/32 |

OTHER PUBLICATIONS

Khitrov, M. (2013). Talking passwords: voice biometrics for data access and security. Biometric Technology Today, 2013(2), pp. 9-11.
Yadav, H. N., & Pal, S. (2010). Robust Mobile Phone User identification & Voice Authentication. Technical Journal of LBSIMDS, pp. 17-25.

* cited by examiner

*Primary Examiner* — Mohammed Waliullah
(74) *Attorney, Agent, or Firm* — Garg Law Firm, PLLC; Rakesh Garg; Michael O'Keefe (57) ABSTRACT

An authentication passphrase is analyzed to identify a first set of parts of speech in the passphrase. Based on comparing the first set with a second set of parts of speech corresponding to a stored passphrase, it is determined that the first set and the second set have less than a threshold number of common elements. In response to the determining, the passphrase is analyzed to score a level of a previously-set emotional tone in the passphrase. Access to a protected resource is allowed in response to the score being above a threshold.

18 Claims, 6 Drawing Sheets

USER AUTHENTICATION USING PASSPHRASE EMOTIONAL TONE

TECHNICAL FIELD

The present invention relates generally to a method, system, and computer program product for user authentication. More particularly, the present invention relates to a method, system, and computer program product for user authentication using the emotional tone of a passphrase.

BACKGROUND

A password is a word or string of characters, to be kept secret from others, used for user authentication to gain access to a resource. Passphrases (longer passwords, such an entire phrase or sentence) and PINs (numerical passwords) are common password variations. The use of static passwords involves tradeoffs—shorter passwords and passwords that use common words are easier for users to remember, but also easier for attackers to guess. Longer passwords or passwords that include non-alphabetical characters may be harder for attackers to guess, but are also harder for users to remember. Static passwords can be stolen visually, by using a keylogger or otherwise monitoring a user's typing. Requiring users to change passwords more frequently may protect against attacks using large caches of stolen passwords, but may also prompt users to adopt easily-guessed password rules to compensate.

Systems also use other means of user authentication. For example, biometric means such as voice identification or fingerprint, iris, or face scanning, are also available. However, such systems are also vulnerable to misuse. For example, in one common scenario an unauthorized person (for example, a spouse or child) simply waits for the authorized person to fall asleep, then applies the sleeping person's finger to the fingerprint sensor to gain access.

To alleviate these problems, some systems are protected by multi-factor authentication, in which a user must provide two or more different types of authentication. For example, some systems require a user to both enter a remembered password and provide a fingerprint, enter a one-time numerical code sent to a different device of the user's, use a token-generating hardware device, or use a token-generating hardware device that includes location information.

SUMMARY

The illustrative embodiments provide a method, system, and computer program product. An embodiment includes a method that analyzes an authentication passphrase to identify a first set of parts of speech in the passphrase. An embodiment determines, based on comparing the first set with a second set of parts of speech corresponding to a stored passphrase, that the first set and the second set have less than a threshold number of common elements. An embodiment analyzes, in response to the determining, the passphrase to score a level of a previously-set emotional tone in the passphrase. An embodiment allows access to a protected resource in response to the score being above a threshold.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Static multi-factor authentication systems are also vulnerable to misuse. For example, fingerprints can be obtained surreptitiously, codes sent to a user's device intercepted, hardware devices can be lost or stolen, and users can simply be forced to enter all the required authentications. Accordingly, what is needed in the art is an authentication method that does not rely on static information such as character strings, biometric information, or specific devices, but instead includes a random element.

The illustrative embodiments recognize that the presently available tools or solutions do not address these needs or provide adequate solutions for these needs. The illustrative embodiments used to describe the invention generally address and solve the above-described problems and other problems related to user authentication, by using the emotional tone of a passphrase.

An embodiment can be implemented as a software application. The application implementing an embodiment can be configured as a modification of an existing user access control system, as a separate application that operates in conjunction with an existing user access control system, a standalone application, or some combination thereof.

Particularly, some illustrative embodiments provide a method by which a user can access a system based on the emotional tone of a user-supplied passphrase.

An embodiment includes a user setup component. During setup, an embodiment allows a user to specify an emotional tone from a set of emotional tones the embodiment recognizes. An embodiment is capable of recognizing one or more emotional tones in a natural language sentence. For example, commercially-available emotional tone analysis services analyze text sentences or entire documents and provide scores reflecting emotional tones present in the sentence or document. One example service scores five emotional tones—anger, disgust, fear, joy, and sadness. For example, such a service might score the sentence, "I'm very sad today" as anger: 0.0, disgust: 0.0, fear: 0.0, joy: 0.0, and sadness: 0.95 (all on a 0-1 scale). As another example, such a service might score the sentence, "It's my birthday! But I'm sad to be getting older" as anger: 0.0, disgust: 0.0, fear: 0.0, joy: 0.5, and sadness: 0.8 (all on a 0-1 scale). An embodiment accepts the user's specified emotional tone using any suitable user interface.

In addition, an embodiment instructs the user that, to gain access to the system, the system will ask the user for a passphrase, and the user should respond with a complete sentence reflecting the specified emotional tone. For example, for a user who had chosen joy as the emotional tone, an example of an acceptable response to the prompt, "Please enter your passphrase," would be, "My dogs are fantastic!"

Once the user has completed the setup process, an embodiment processes user authentication requests. Either in conjunction with another user authentication factor (such as a fingerprint, or static password) or as the sole means of user authentication for a system, an embodiment asks a user to provide a passphrase. An embodiment interacts with the user using any suitable user interface. For example, the embodiment may display instructions on a screen or instruct the user using voice, and the user may respond by typing on a keyboard or via voice input.

An embodiment accepts the user's response to the passphrase request and analyzes the response. If the response is in voice form, the embodiment converts the response to a text passphrase, using any suitable speech-to-text technique. If the response is received in text form, no conversion is necessary.

An embodiment analyzes the user's passphrase to identify parts of speech in the passphrase. An embodiment performs parts of speech analysis using any suitable technique, for example natural language understanding. One illustrative embodiment identifies any subjects, verbs, and objects in the passphrase. An embodiment also normalizes all the identified parts of speech to set forms. For example, all identified objects, whether singular or plural, are converted to the singular form. As another example, irregular verbs are converted to the first person singular form.

To prevent passphrase reuse, an embodiment compares the identified parts of speech with corresponding parts of speech of any previously-used passphrases the embodiment has stored. An embodiment rejects a passphrase containing more than a threshold number of parts of speech that were used in a previous passphrase. For example, if the user had previously used, "I'm sad about my dogs" for a passphrase reflecting sadness, an embodiment would reject the new passphrase "I'm sad about my dog." Reducing passphrases to only certain parts of speech (for example, subject, verb, and object) prevents other minor variations—such as, for example, "I'm sad about my white dogs," because "white" is not a subject, verb, or object in that sentence. Rejecting previously-used passphrases and minor variations on previously-used passphrases helps prevent unauthorized access by, for example, a malicious actor recording and playing back a passphrase the user entered previously.

An embodiment allows configuration of the threshold number of parts of speech to enforce more or less strict access control. For example, a configuration enforcing a mid-range level of access control might set the threshold to two. In this case, an embodiment would allow use of both "I am sad about my dog" and "I am sad about my cat" in quick succession because while the subjects ("I") and verbs ("am") of the two passphrases are the same, the objects ("dog" and "cat") are different. A configuration enforcing a stricter level of access control might set the threshold to one. In this case, following "I am sad about my dog" an embodiment would disallow "I am sad about my cat" because the subjects ("I") and verbs ("am") of the two passphrases are the same, but allow "John is sad about my cat" because now only the verb ("is", "am") is common to all once normalized to the singular first person form.

If an embodiment rejects the passphrase, the authentication attempt ends. Depending on the configuration, an embodiment may allow additional authentication attempts using a passphrase, allow additional authentication attempts using one or more different authentication methods, or disallow additional authentication attempts for a period of time or until some other administrative action is taken with respect to that user.

If an embodiment accepts the passphrase as being sufficiently unique, the embodiment analyzes the emotional tone of the passphrase using any suitable emotional analysis technique. For example, an embodiment analyzes the passphrase to produce scores corresponding to the degrees of anger, disgust, fear, joy, and sadness present in the passphrase.

The embodiment compares the scores for the passphrase against the emotional tone the user had previously set up. The embodiment accepts the passphrase if the passphrase score for the pre-set emotional tone is above an acceptability threshold. For example, if the user had previously set joy as the emotional tone, the passphrase, "I love my cat!" would have a joy score sufficiently high to be accepted, but the passphrase, "I'm sad about my cat" would not have a joy score sufficiently high to be accepted.

Alternatively, instead of analyzing the passphrase against all emotional tones the embodiment is capable of recognizing, an embodiment simply analyzes the passphrase to produce a score for the degree of the pre-set emotional tone. For example, if the user had previously set joy as the emotional tone, this embodiment would determine a joy score for the passphrase, but not a sadness score.

Once the user has been authenticated using the passphrase, an embodiment allows the user access to the system protected by the embodiment. The embodiment also optionally stores the passphrase, to prevent reuse of the passphrase or minor variations of the passphrase. An embodiment stores a configurable number of previous acceptable passphrases, or the passphrases used within a configurable time period. For example, an embodiment may store the last five or ten acceptable passphrases, or all the passphrases used within the last week or month. Rejected passphrases need not be stored, although an embodiment stores the number of rejected passphrases, or the number of passphrases rejected within a particular recent time period, to enable suspension, locking out, or another action relating to the user's access if the number of rejected passphrases, or the number of recently-rejected passphrases, rises above a configurable threshold.

The manner of user authentication using the emotional tone of a passphrase described herein is unavailable in the presently available methods. A method of an embodiment described herein, when implemented to execute on a device or data processing system, comprises substantial advancement of the functionality of that device or data processing system in analyzing a user passphrase for degree of duplication and emotional tone and authenticating the user if the degree of duplication and emotional tone fall within preset limits.

The illustrative embodiments are described with respect to certain types of passwords, passphrases, input methods, analyses, techniques, thresholds, validations, responses, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
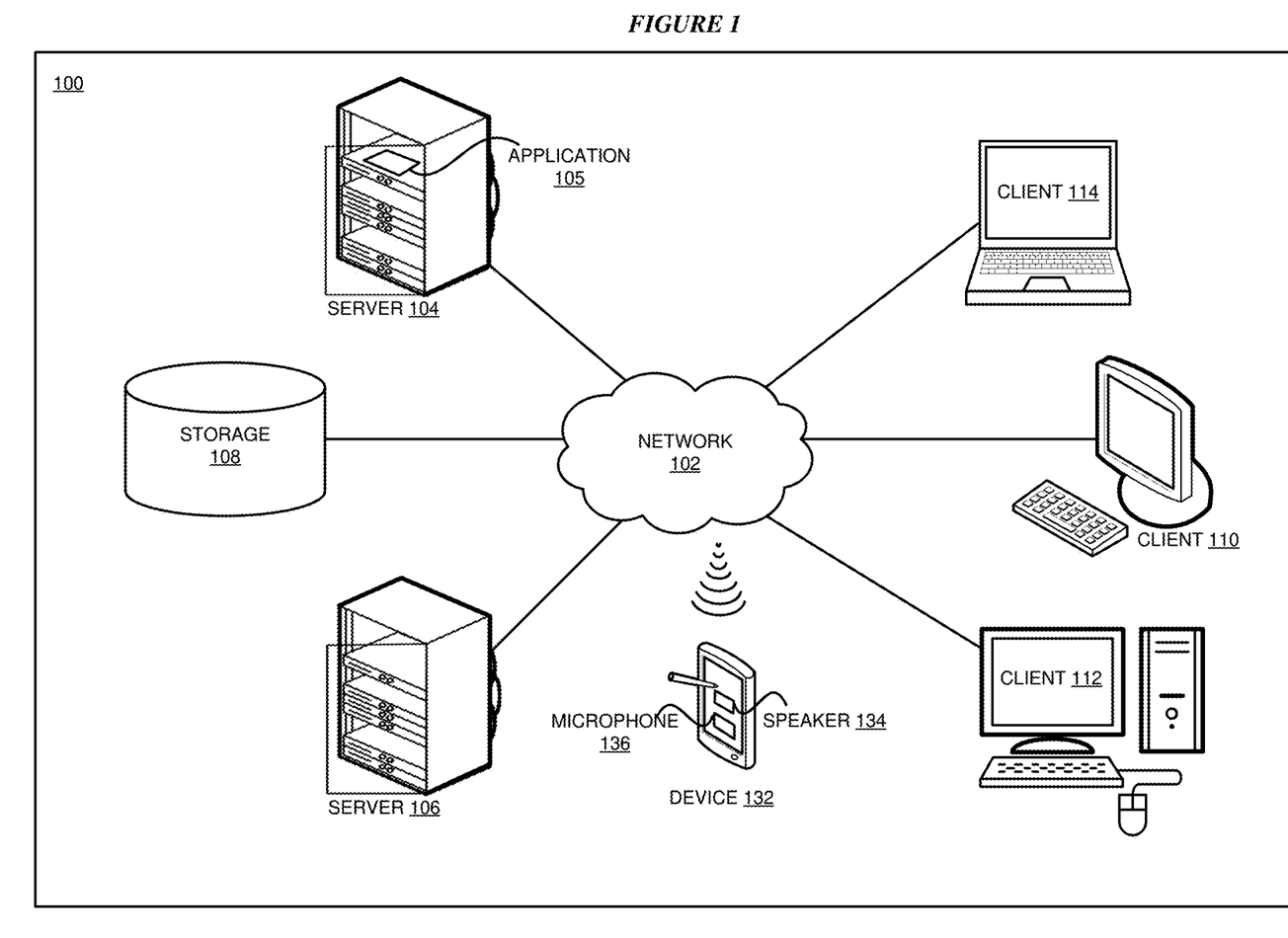
FIG. 1 depicts a block diagram of a network of data processing systems in which illustrative embodiments may be implemented.
Figure 2:
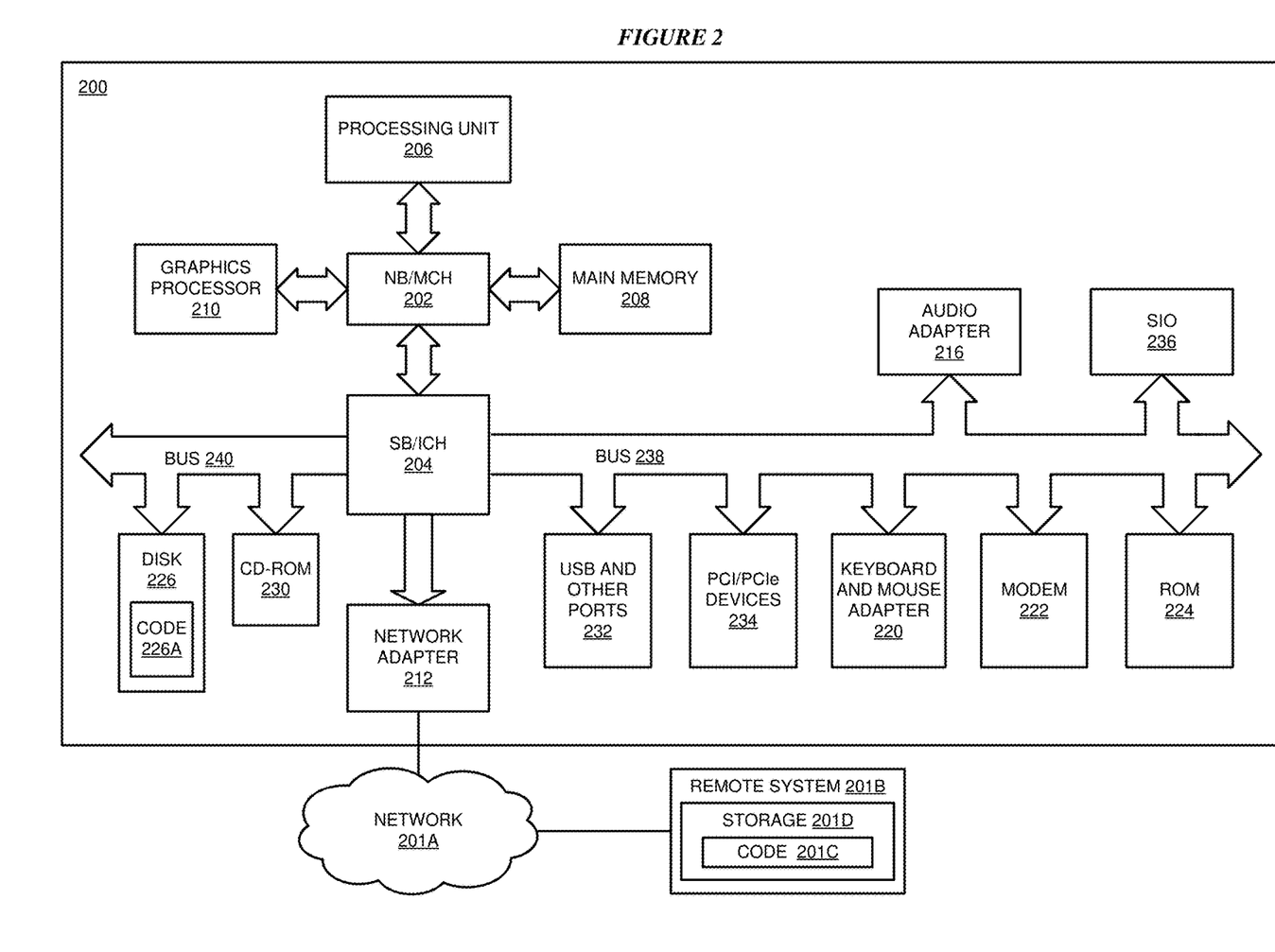
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes speaker 134 and microphone 136 suitable for voice prompts to a user of device 132 and voice input from a user of device 132.

Application 105 implements an embodiment described herein. Application 105 executes in server 104, or any other suitable environment, such as server 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
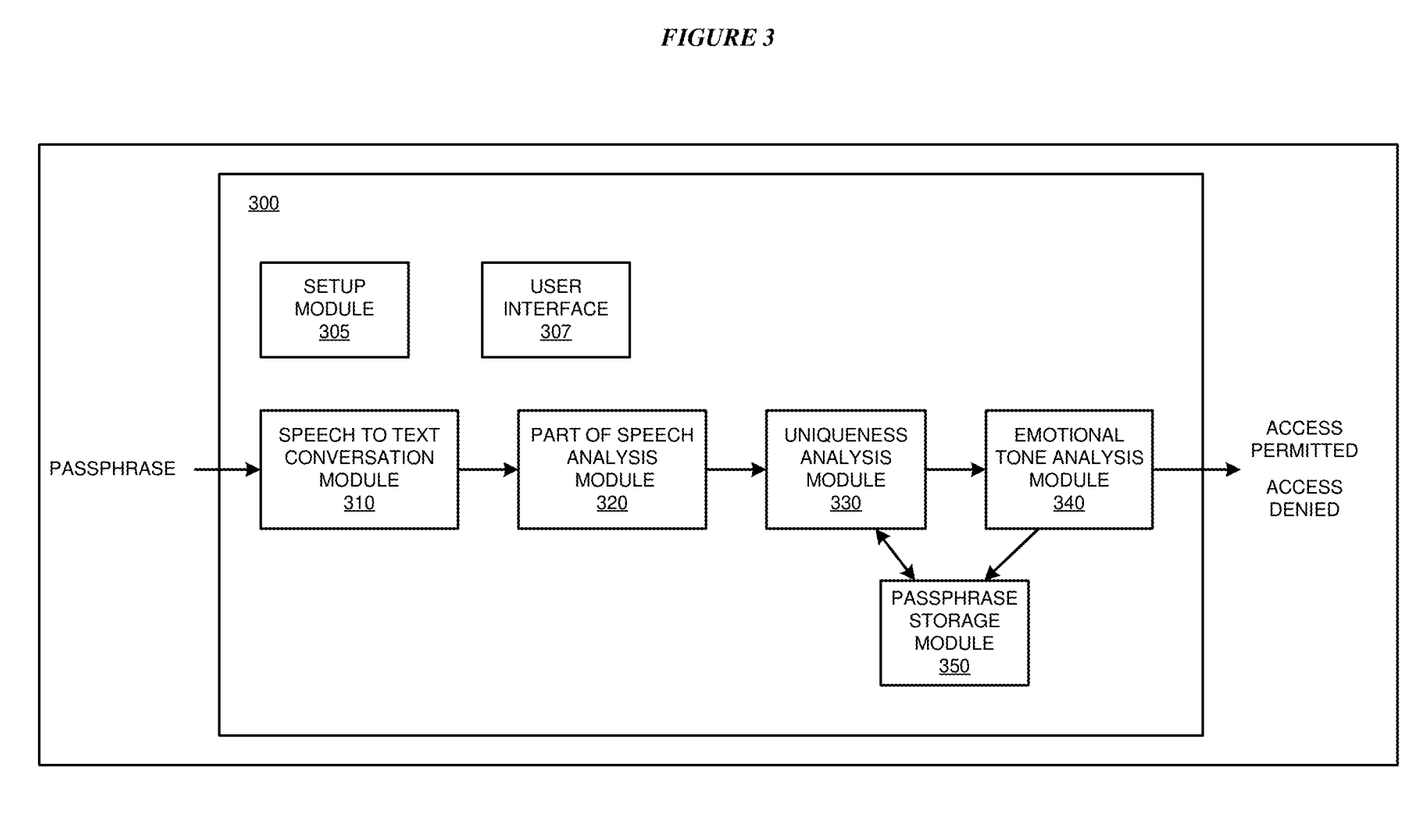
FIG. 3 depicts a block diagram of an example configuration for user authentication using the emotional tone of a passphrase in accordance with an illustrative embodiment.

With reference to FIG. 3, this figure depicts a block diagram of an example configuration for user authentication using the emotional tone of a passphrase in accordance with an illustrative embodiment. Application 300 is an example of application 105 in FIG. 1 and executes in server 104 in FIG. 1.

Application 300 includes user interface 307. User interface 307 is configurable to interact with a user in text form, voice form, or both. When interacting with a user in text form, user interface 307 displays instructions for the user on a display, and the user types responses on a keyboard, makes selections using a pointing device, handwrites responses on a suitably-equipped surface using an appropriate device, or uses another means of text entry. When interacting with a user in voice form, user interface 307 uses a speaker to prompt the user, and uses a microphone to receive the user's response. User interface 307 can also be configured to interact using a combination of both voice and text—for example, user interface 307 can prompt the user using voice but accept a response via text, or vice versa.

Setup module 305 allows a user to specify an emotional tone from a set of emotional tones application 300 recognizes. Setup module 305 also instructs the user that, to gain access to the system, the system will ask the user for a passphrase, and the user should respond not with a memorized, static passphrase but with a complete sentence reflecting the specified emotional tone. For example, for a user who had chosen joy as the emotional tone, an example of an acceptable response to the prompt, "Please enter your passphrase," would be, "My dogs are fantastic!"

Once the user has completed the setup process, the application processes user authentication requests. In particular, via user interface 307 application 300 asks a user to provide a passphrase, and the user provides one. If required, speech to text conversion module 310 converts the user's response to a text passphrase, using any suitable speech-to-text technique. If the user provides a passphrase in text form, no conversion is necessary.

Once the user's passphrase is in text format, part of speech analysis module 320 analyzes the user's passphrase to identify parts of speech in the passphrase, using any suitable technique, for example natural language understanding. In particular, part of speech analysis module 320 identifies any subjects, verbs, and objects in the passphrase, and normalizes all the identified parts of speech to set forms. For example, all identified objects, whether singular or plural, are converted to the singular form, and irregular verbs are converted to the first person singular form.

To prevent passphrase reuse, uniqueness analysis module 330 compares the identified parts of speech with previously-used passphrases the application has stored in passphrase storage module 350. Uniqueness analysis module 330 rejects a passphrase containing more than a threshold number of parts of speech that were used in a previous passphrase. If uniqueness analysis module 330 rejects the passphrase, the authentication attempt ends. Depending on the configuration, the application may allow additional authentication attempts using a passphrase or alternative methods, or disallow additional authentication attempts for a period of time or until some other administrative action is taken.

If uniqueness analysis module 330 accepts the passphrase as being sufficiently unique, emotional tone analysis module 340 analyzes the emotional tone of the passphrase using any suitable emotional analysis technique, producing scores corresponding to the degrees of emotional tones present in the passphrase. Emotional tone analysis module 340 also compares the scores for the passphrase against the emotional tone the user had previously set up. Alternatively, instead of analyzing the passphrase against all emotional tones the embodiment is capable of recognizing, module 340 simply analyzes the passphrase to produce a score for the degree of the pre-set emotional tone. Emotional tone analysis module 340 accepts the passphrase if the passphrase score for the pre-set emotional tone is above an acceptability threshold.

Once the user has been authenticated using the passphrase, the application allows the user access to the system protected by the application. In addition, module 340 stores the acceptable passphrase in passphrase storage module 350 to prevent reuse of the passphrase or minor variations of the passphrase.

Figure 4:
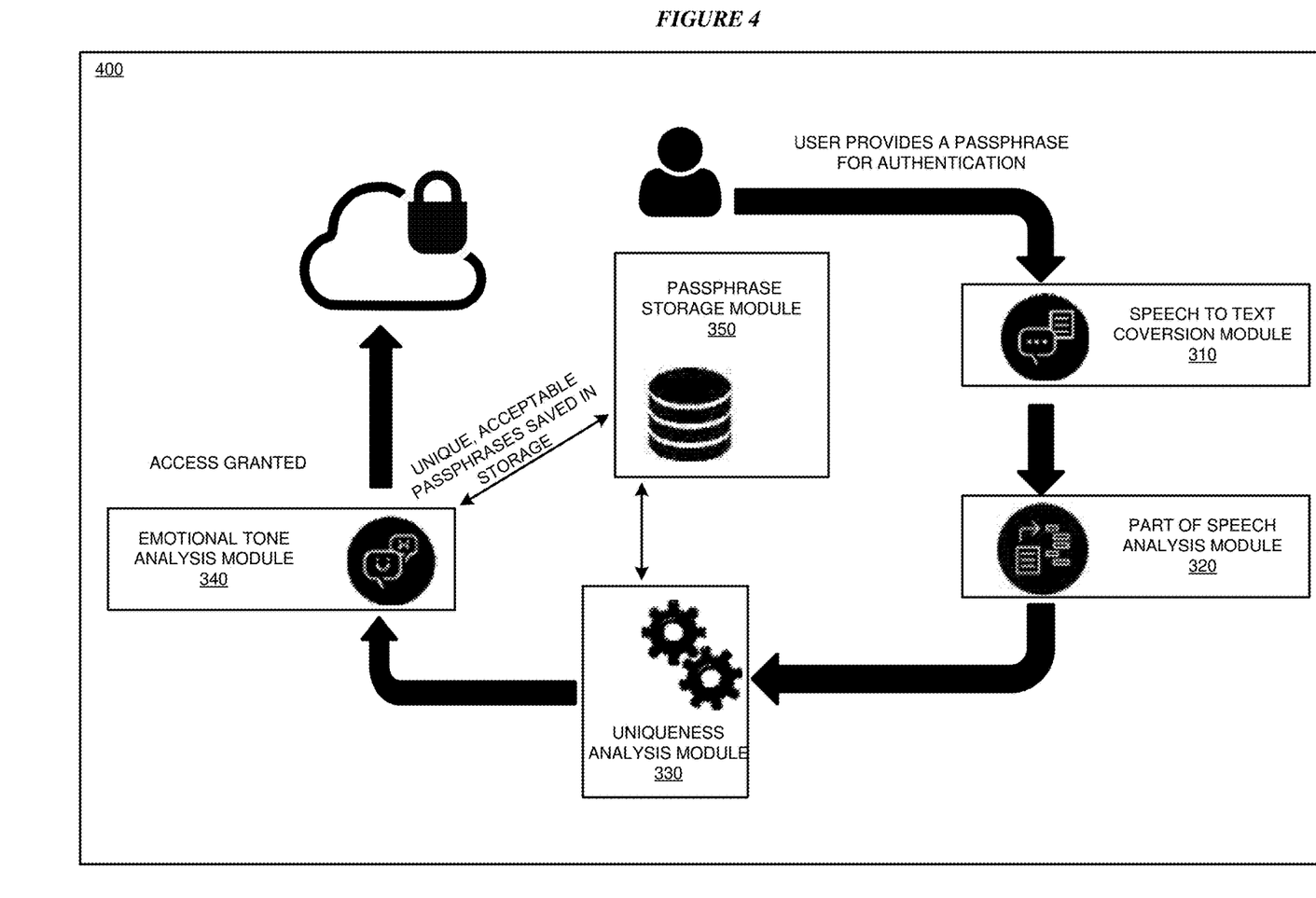
FIG. 4 depicts a flow diagram reflecting an example process for user authentication using the emotional tone of a passphrase in accordance with an illustrative embodiment.

With reference to FIG. 4, this figure depicts a flow diagram reflecting an example process for user authentication using the emotional tone of a passphrase in accordance with an illustrative embodiment. Application 300, speech to text conversion module 310, part of speech analysis module 320, uniqueness analysis module 330, emotional tone analysis module 340, and passphrase storage module 350 are the same as application 300, speech to text conversion module 310, part of speech analysis module 320, uniqueness analysis module 330, emotional tone analysis module 340, and passphrase storage module 350 in FIG. 3.

To gain access to a system protected by the application, a user provides a passphrase when prompted. If required, speech to text conversion module 310 converts the user's response to a text passphrase, using any suitable speech-to-text technique. If the user provides a passphrase in text form, no conversion is necessary.

Once the user's passphrase is in text format, part of speech analysis module 320 analyzes the user's passphrase to identify parts of speech in the passphrase, using any suitable technique, for example natural language understanding. In particular, part of speech analysis module 320 identifies any subjects, verbs, and objects in the passphrase, and normalizes all the identified parts of speech to set forms. For example, all identified objects, whether singular or plural, are converted to the singular form, and irregular verbs are converted to the first person singular form.

To prevent passphrase reuse, uniqueness analysis module 330 compares the identified parts of speech with previously-used passphrases the application has stored in passphrase storage module 350. Uniqueness analysis module 330 rejects a passphrase containing more than a threshold number of parts of speech that were used in a previous passphrase. If uniqueness analysis module 330 rejects the passphrase, the authentication attempt ends. Depending on the configuration, the application may allow additional authentication attempts using a passphrase or alternative methods, or disallow additional authentication attempts for a period of time or until some other administrative action is taken.

If uniqueness analysis module 330 accepts the passphrase as being sufficiently unique, emotional tone analysis module 340 analyzes the emotional tone of the passphrase using any suitable emotional analysis technique, producing scores corresponding to the degrees of emotional tones present in the passphrase. Emotional tone analysis module 340 also compares the scores for the passphrase against the emotional tone the user had previously set up. Alternatively, instead of analyzing the passphrase against all emotional tones the embodiment is capable of recognizing, module 340 simply analyzes the passphrase to produce a score for the degree of the pre-set emotional tone. Emotional tone analysis module 340 accepts the passphrase if the passphrase score for the pre-set emotional tone is above an acceptability threshold.

Once the user has been authenticated using the passphrase, the application allows the user access to the system protected by the application. In addition, module 340 stores the acceptable passphrase in passphrase storage module 350 to prevent reuse of the passphrase or minor variations of the passphrase.

Figure 5:
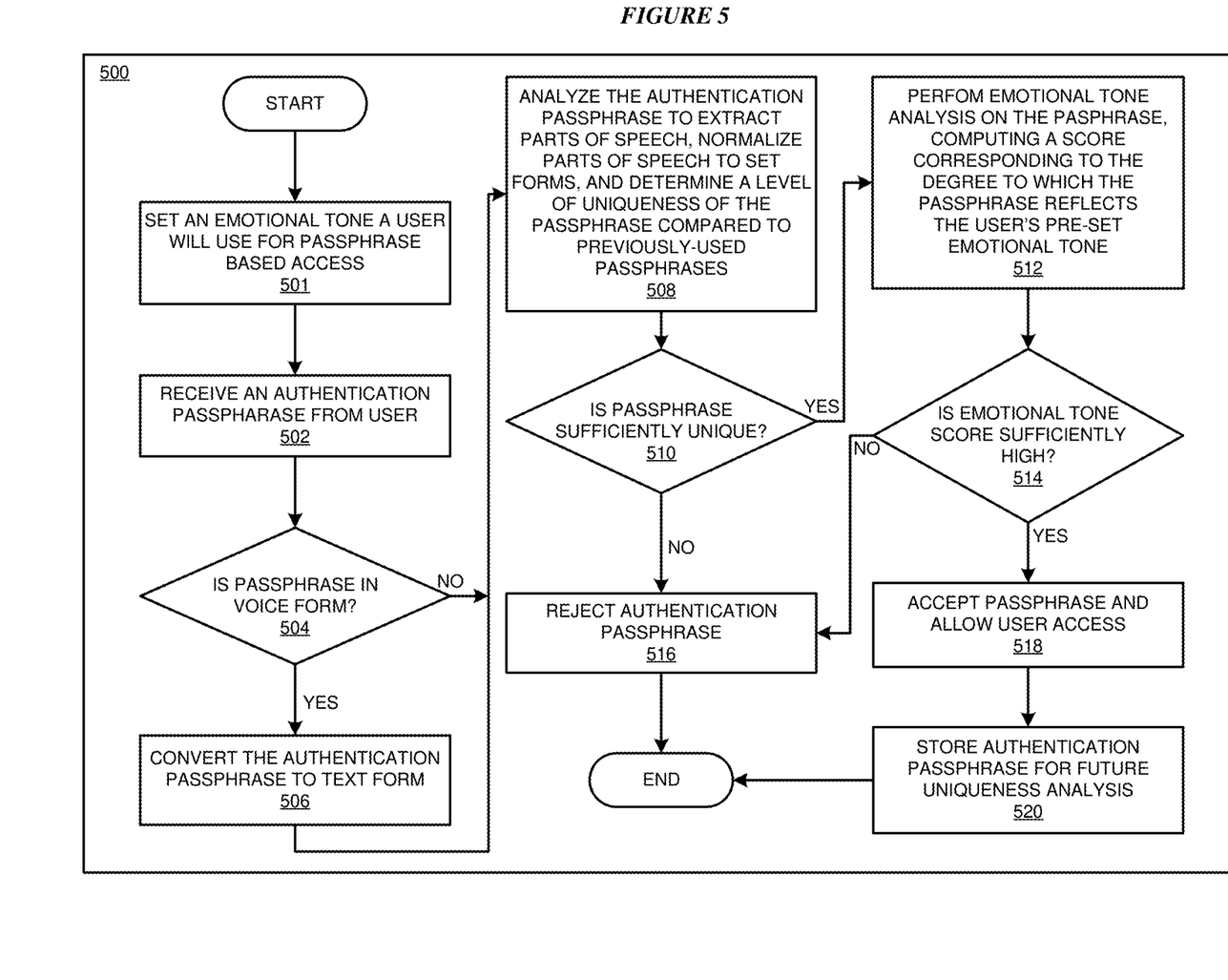
FIG. 5 depicts a flowchart of an example process for user authentication using the emotional tone of a passphrase in accordance with an illustrative embodiment.

With reference to FIG. 5, this figure depicts a flowchart of an example process for user authentication using the emotional tone of a passphrase in accordance with an illustrative embodiment. Process 500 can be implemented in application 300 in FIG. 3.

In block 501, in a setup phase, the application receives a setting of an emotional tone a user will use for passphrase-based access to a system protected by application 500. Then, in block 502, the application receives an authentication passphrase from a user. In block 504, the application determines if the passphrase was received in voice form. If so ("YES" path of block 504), in block 506 the application converts the authentication passphrase to text form, using any suitable speech-to-text technique. If voice-to-text conversion is not necessary ("NO" path of block 504), block 506 is skipped. In either case execution continues with block 508.

In block 508 the application analyzes the text version of the authentication passphrase, using natural language understanding techniques, to extract parts of speech, normalize the parts of speech to set forms, and determine a level of uniqueness of the passphrase compared to previously-used passphrases. In particular, the application analyzes the passphrase to identify parts of speech in the passphrase—particularly any subjects, verbs, and objects in the passphrase. The application also normalizes all the identified parts of speech to set forms. All extracted nouns and verbs, whether singular or plural, are converted to the singular form. Because verbs may vary with their subject (e.g. "I am" vs. "you are" vs. "he is" vs. "they are"), verbs are converted to the first person singular form. The application also compares the extracted parts of speech with corresponding parts of speech of any previously-used passphrases the embodiment has stored, to determine whether the current passphrase is sufficiently unique. Preventing the use of passphrases that are very similar to previously-used passphrases guards against malicious actors attempting to gain access using passphrases a user has been overheard or recorded using before.

In block 510 the application checks whether the passphrase has a sufficient level of uniqueness. If not ("NO" path of block 510), in block 516 the application rejects the authentication passphrase and the process ends.

If the passphrase is above a threshold uniqueness level ("YES" path of block 510), in block 512 the application performs emotional tone analysis on the passphrase, computing a score corresponding to the degree to which the passphrase reflects the user's pre-set emotional tone. In block 514 the application checks whether the emotional tone score is above a threshold score. If not ("("NO" path of block 514), in block 516 the application rejects the authentication passphrase and the process ends. If the emotional tone score is above a threshold score ("YES" path of block 514), in block 518 the application accepts the passphrase, allowing the user access, and in block 520 the application stores the accepted passphrase for future use. Then the application ends.

Figure 6:
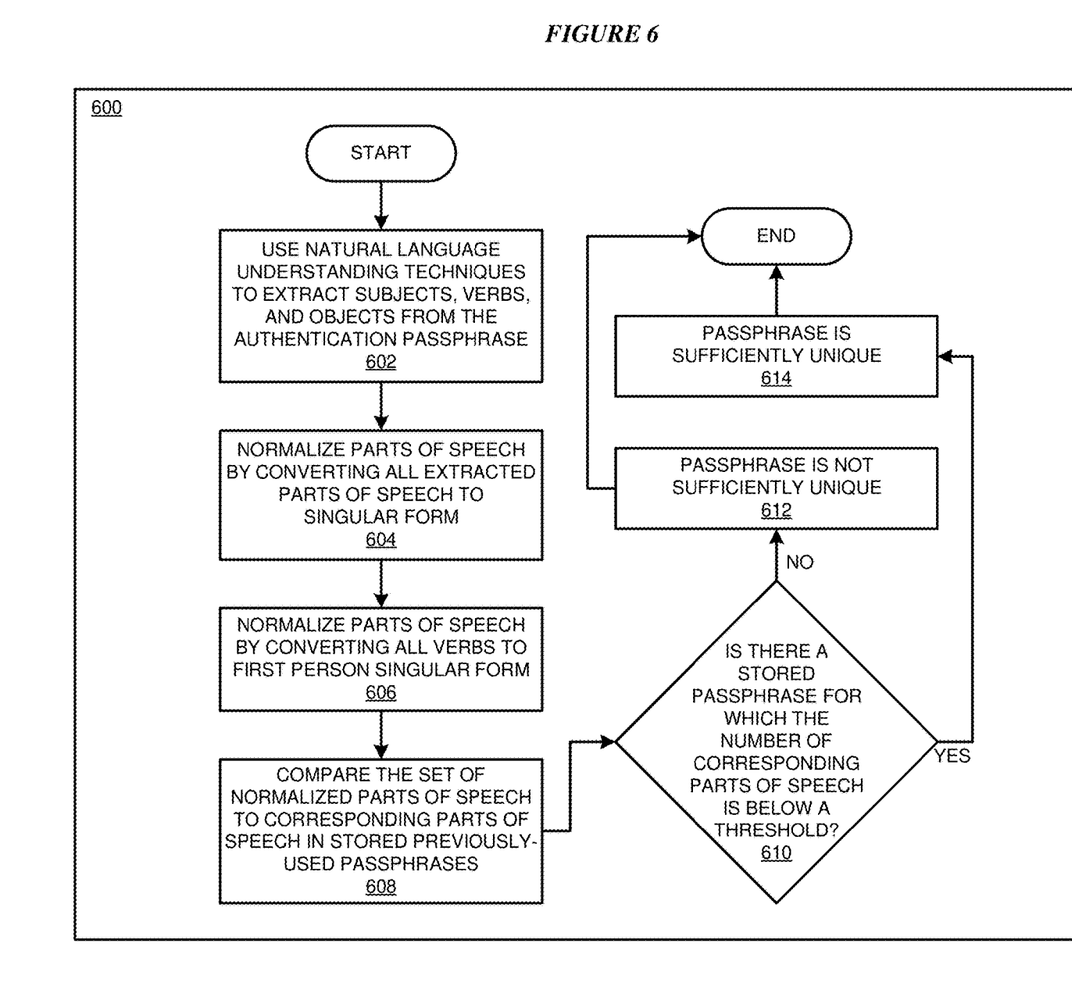
FIG. 6 depicts a flowchart of portion of an example process for user authentication using the emotional tone of a passphrase in accordance with an illustrative embodiment.

With reference to FIG. 6, this figure depicts a flowchart of portion of an example process for user authentication using the emotional tone of a passphrase in accordance with an illustrative embodiment. In particular, process 600 provides more detail regarding block 508 in FIG. 5. Process 600 can be implemented in application 300 in FIG. 3.

In block 602 the application analyzes the text version of the authentication passphrase, using natural language understanding techniques, to extract parts of speech—particularly any subjects, verbs, and objects—in the passphrase. In block 604 the application normalizes all the extracted nouns and verbs, whether singular or plural, by converting them to the singular form. Because verbs may vary with their subject, in block 606 all extracted verbs are converted to the first person singular form. In block 608, the application compares the set of normalized parts of speech with corresponding parts of speech of any previously-used passphrases the embodiment has stored, to determine whether the current passphrase is sufficiently unique. In block 610, the application determines whether there is a stored passphrase with less than a threshold degree of correspondence with corresponding parts of speech in the passphrase currently being analyzed. If yes, in block 614 the application determines that the passphrase is sufficiently unique to be acceptable; if no, in block 612 the application determines that the passphrase is insufficiently unique, and should be rejected. Then the application ends.

Thus, a computer implemented method, system or apparatus, and computer program product are provided in the illustrative embodiments for user authentication using the emotional tone of a passphrase and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

analyzing an authentication passphrase to identify a first set of parts of speech in the authentication passphrase, the authentication passphrase comprising a first sentence in narrative text form, the first sentence reflecting a previously-set emotional tone, the first set of parts of speech comprising any of one or more members of a set comprising one or more subjects, objects, and verbs in the authentication passphrase;

determining, based on comparing the first set with a second set of parts of speech comprising any of one or more members of a set comprising one or more subjects, objects, and verbs in a stored passphrase, the stored passphrase comprising a second sentence in narrative text form, the second sentence reflecting the previously-set emotional tone, that the first set and the second set have less than a threshold number of parts of speech in common;

determining, based on comparing the first set with a third set of parts of speech comprising any of one or more members of a set comprising one or more subjects, objects, and verbs in a second stored passphrase, that the first set and the third set have less than a threshold number of parts of speech in common;

scoring, in response to the determining, the authentication passphrase, the scoring determining a level of the previously-set emotional tone in the text of the authentication passphrase; and allowing access to a protected resource in response to the score being above a threshold.

2. The method of claim 1, further comprising: receiving, from a user, speech comprising a voice form of the authentication passphrase; and converting the speech into the authentication passphrase.

3. The method of claim 1, wherein analyzing the authentication passphrase to identify the first set of parts of speech in the authentication passphrase further comprises: normalizing each of the parts of speech in the first set of parts of speech in the authentication passphrase to a set form.

4. The method of claim 1, wherein the threshold number of parts of speech in common is set corresponding to a desired level of access control strictness.

5. The method of claim 1, further comprising: determining, based on comparing the first set with the second, that the first set and the second set have equal to or greater than a threshold number of parts of speech in common; and rejecting, in response to the determining, the authentication passphrase.

6. The method of claim 1, further comprising: receiving, during a setup phase, the previously-set from emotional tone.

7. The method of claim 1, further comprising: storing, in response to the determined score being above a threshold, the first set of parts of speech.

8. A computer usable program product comprising one or more computer-readable storage devices, and program instructions stored on at least one of the one or more storage devices, the stored program instructions comprising:

program instructions to analyze an authentication passphrase to identify a first set of parts of speech in the authentication passphrase, the authentication passphrase comprising a first sentence in narrative text form, the first sentence reflecting a previously-set emotional tone, the first set of parts of speech comprising any of one or more members of a set comprising one or more subjects, objects, and verbs in the authentication passphrase;

program instructions to determine, based on comparing the first set with a second set of parts of speech comprising any of one or more members of a set comprising one or more subjects, objects, and verbs in to a stored passphrase, the stored passphrase comprising a second sentence in narrative text form, the second sentence reflecting the previously-set emotional tone, that the first set and the second set have less than a threshold number of parts of speech in common;

program instructions to determine, based on comparing the first set with a third set of parts of speech comprising any of one or more members of a set comprising one or more subjects, objects, and verbs in a second stored passphrase, that the first set and the third set have less than a threshold number of parts of speech in common;

program instructions to score, in response to the determining, the authentication passphrase, the scoring determining a level of the previously-set emotional tone in the text of the authentication passphrase; and program instructions to allow access to a protected resource in response to the score being above a threshold.

9. The computer usable program product of claim 8, further comprising: program instructions to receive, from a user, speech comprising a voice form of the authentication passphrase; and program instructions to convert the speech into the authentication passphrase.

10. The computer usable program product of claim 9, wherein analyzing the authentication passphrase to identify the first set of parts of speech in the authentication passphrase further comprises: program instructions to normalize each of the parts of speech in the first set of parts of speech in the authentication passphrase to a set form.

11. The computer usable program product of claim 8, wherein the threshold number of parts of speech in common is set corresponding to a desired level of access control strictness.

12. The computer usable program product of claim 8, further comprising: program instructions to determine, based on comparing the first set with the second, that the first set and the second set have equal to or greater than a threshold number of parts of speech in common; and program instructions to reject, in response to the determining, the authentication passphrase.

13. The computer usable program product of claim 8, further comprising: program instructions to receive, during a setup phase, the previously-set emotional tone.

14. The computer usable program product of claim 8, further comprising: program instructions to store, in response to the determined score being above a threshold, the first set of parts of speech.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to analyze an authentication passphrase to identify a first set of parts of speech in the authentication passphrase, the authentication passphrase comprising a first sentence in narrative text form, the first sentence reflecting a previously-set emotional tone, the first set of parts of speech comprising any of one or more members of a set comprising one or more subjects, objects, and verbs in the authentication passphrase;

program instructions to determine, based on comparing the first set with a second set of parts of speech comprising any of one or more members of a set comprising one or more subjects, objects, and verbs in a stored passphrase, the stored passphrase comprising a second sentence in narrative text form, the second sentence reflecting the previously-set emotional tone, that the first set and the second set have less than a threshold number of parts of speech in common;

program instructions to determine, based on comparing the first set with a third set of parts of speech comprising any of one or more members of a set comprising one or more subjects, objects, and verbs in a second stored passphrase, that the first set and the third set have less than a threshold number of parts of speech in common;

program instructions to score, in response to the determining, the authentication passphrase, the scoring determining a level of the previously-set emotional tone in the text of the authentication passphrase; and program instructions to allow access to a protected resource in response to the score being above a threshold.

18. The computer system of claim 17, further comprising: program instructions to receive, from a user, speech comprising an authentication passphrase in a voice form of the authentication passphrase; and program instructions to convert the speech into the authentication passphrase.

\* \* \* \* \*